July 15, 1924.

E. KREISSIG

SPRING

Filed Jan. 15, 1924

1,501,220

Inventor

Patented July 15, 1924.

1,501,220

UNITED STATES PATENT OFFICE.

ERNST KREISSIG, OF UERDINGEN, GERMANY.

SPRING.

Application filed January 15, 1924. Serial No. 686,283.

*To all whom it may concern:*

Be it known that I, ERNST KREISSIG, a citizen of the German Republic, and residing at Uerdingen, Germany, have invented certain new and useful Improvements in Springs, of which the following is a specification.

The present invention relates to a new type of spring which differs from those heretofore known in that, contrary to the existing flexional and torsional springs, it will operate under tensional or compressive strains only, or under both kinds of strains simultaneously.

Figure 1:
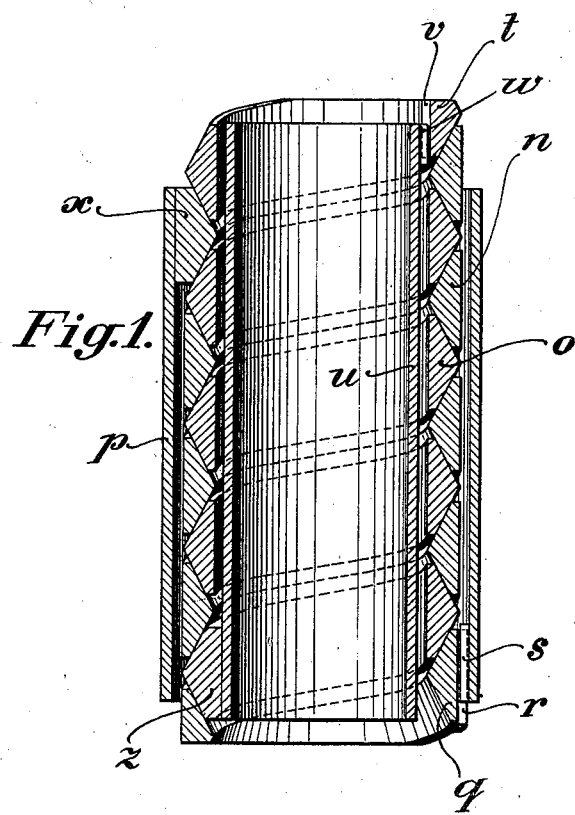
Figure 2:
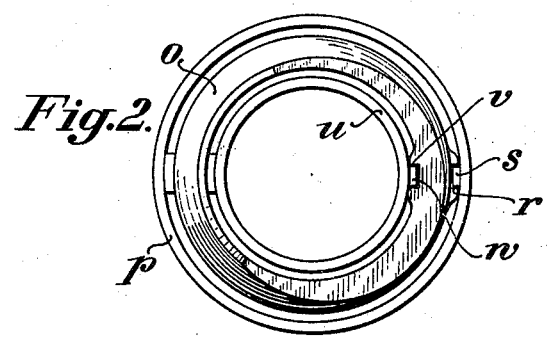

In the accompanying drawing Fig. 1 is a longitudinal cross section through a spring according to the present invention. Fig. 2 is a cross-section through the spring according to the present invention.

According to the present invention the spring is composed of at least two helical members $n$ and $o$ formed alternately with inner and outer conical surfaces in telescoping engagement with one another, the ends of which helices are prevented from tangential movement.

In the example shown one end $x$ of the outer helical member $n$ is rigidly secured to a tubular member $p$, and the other end $q$ of the member $n$ is formed with a longitudinal groove $r$ engaged by a feather $s$ secured to the tubular member $p$. In a similar way one end $z$ of the inner helical member $o$ is rigidly secured to a tubular member $u$, while the opposite end $t$ is formed with a groove $v$ engaged by a feather $w$ secured to the tubular member $u$.

If now an axial pressure is exerted on the system the deformation of the helical members can not cause an increase or a reduction of the turns of the helical members. Therefore the individual windings are respectively extended or compressed, so that the turns of the helical members are subject only to tension or compression strains. The bending strains are very small and practically zero, because the change of the diameters of the turns is almost zero. The tubular members may be dispensed with if at each side of the helical members the end of one of the said helical members is so connected with that of the other one that the tangential strains are balanced. The spring effect is several times greater than with any other known type of spring, as the capacity of the spring according to the present invention is, for a given volume, at least three times as great as with the best flexional or torsional spring known.

The taper of the conical surfaces should be such that the spring will, by all means, return into its original position, as far as the friction between the conical surfaces is concerned. The latter will, on the spring returning, have a very effective braking influence which will be of great advantage, particularly with buffer springs.

It is obvious that also several such systems may be disposed within each other so that it will be possible to obtain a hereto unknown high spring effect within a very small volume. For the outer or the inner helical members also non-elastic parts which have a merely radial effect may be substituted, so that only one member has the spring effect.

It is obvious that in order to prevent the tangential movement of the ends of the members, both ends of the helical members on each side of the spring are fixed to one another.

I claim:

1. A spring comprising inner and outer helical members formed with interengaging, cooperating faces, and a pair of members, one for each helical member, fixed to one end of the respective helical member and connected to the opposite end of the latter to permit sliding movement thereof in an axial direction only.

2. A spring comprising a plurality of helical members formed respectively internally and externally with conical faces, the conical faces of each member tapering in opposite directions, and the members being in telescoping engagement with corresponding conical faces, and means carried by each helical member independent of the companion helical member for holding both ends of the respective member against relative rotary movement.

3. A spring comprising interior and exterior sleeves, and a plurality of cooperating helical members interposed between the sleeves and each helical member being attached at each end to a respective sleeve to prevent only tangential movement.

4. A spring comprising inner and outer helical members formed respectively internally and externally with conical faces in telescoping engagement with one another, inner and outer sleeves between which the helical members are interposed, the two ends of each member being attached to the adjacent sleeve in order to prevent tangential movement.

5. A spring comprising inner and outer helical members formed respectively internally and externally with conical faces in telescoping engagement with one another, an inner tubular member for the inner helical member and an outer tubular member for the outer helical member, each fixed to one end of the respective helical member and provided with a longitudinal groove engaged by the other end of said respective helical member.

In testimony whereof I affix my signature.

ERNST KREISSIG.